United States Patent
Ormachea et al.

(10) Patent No.: US 6,643,925 B1
(45) Date of Patent: Nov. 11, 2003

(54) INSTALLATION DEVICE FOR INSTALLING A FLEXIBLE SENSOR ON A SEAT CUSHION

(75) Inventors: Raymond J. Ormachea, Fraser, MI (US); Don Hamilton, Wixom, MI (US); Paul S. Severinski, Brownstown, MI (US); Alan A. Boisvert, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 319 days.

(21) Appl. No.: 09/654,273

(22) Filed: Sep. 1, 2000

Related U.S. Application Data
(60) Provisional application No. 60/152,061, filed on Sep. 2, 1999.

(51) Int. Cl.$^7$ .............................................. H01R 43/00
(52) U.S. Cl. ............................ 29/857; 29/854; 29/450; 29/869; 29/881; 29/DIG. 44; 174/72 A; 156/212; 156/214; 156/285; 156/513; 156/581
(58) Field of Search ......................... 29/854, 857, 334, 29/450, 451, 869, 872, 881, 739, 740, 743, DIG. 44; 174/72 A, 48; 156/214, 212, 256, 285, 290, 308.2, 497, 513, 529, 581

(56) References Cited

U.S. PATENT DOCUMENTS

| | | | |
|---|---|---|---|
| 4,378,396 A | 3/1983 | Urai et al. | |
| 4,403,356 A | 9/1983 | Urai | |
| 4,722,760 A | 2/1988 | Shimada | |
| 4,795,517 A | * 1/1989 | Elliott et al. ................ | 156/221 |
| 4,797,962 A | 1/1989 | Goode | |
| 4,995,926 A | 2/1991 | Urai | |
| 5,000,805 A | * 3/1991 | Lowe ......................... | 156/90 |
| 5,068,504 A | 11/1991 | Rogers | |
| 5,157,372 A | 10/1992 | Langford | |
| 5,260,684 A | 11/1993 | Metzmaker | |
| 5,309,135 A | 5/1994 | Langford | |
| 5,372,668 A | * 12/1994 | Bracesco ..................... | 156/214 |
| 5,413,378 A | 5/1995 | Steffens, Jr. et al. | |
| 5,454,591 A | 10/1995 | Mazur et al. | |
| 5,474,327 A | 12/1995 | Schousek | |
| 5,515,933 A | 5/1996 | Meyer et al. | |
| 5,573,269 A | 11/1996 | Gentry et al. | |
| 5,592,705 A | 1/1997 | West | |
| 5,602,425 A | 2/1997 | Wilhelmi et al. | |
| 5,605,348 A | 2/1997 | Blackburn et al. | |
| 5,612,876 A | 3/1997 | Zeidler et al. | |
| 5,615,917 A | 4/1997 | Bauer | |
| 5,984,349 A | 11/1999 | Van Voorhies | |

FOREIGN PATENT DOCUMENTS

| | | |
|---|---|---|
| DE | 42 37 072 | 12/1993 |
| EP | 0 900 705 | 3/1999 |
| WO | WO 98/30413 | 7/1998 |

* cited by examiner

*Primary Examiner*—Richard Chang
(74) *Attorney, Agent, or Firm*—Bill C. Panagos

(57) ABSTRACT

An installation device for installing a flexible sensor apparatus on a seating surface of a seat cushion includes an installation fixture having a saddle. The saddle includes a first face having a seating portion recess formed therein which generally conforms to the shape of the seating surface of the seat cushion. The first face further has at least one locating recess formed in the seating portion recess. The locating recess generally conforms to the shape of a portion of the flexible sensor apparatus. The saddle further has ports extending from the locating recess to a vacuum source, wherein a vacuum from the vacuum source retains the flexible sensor apparatus in the locating recess.

14 Claims, 6 Drawing Sheets

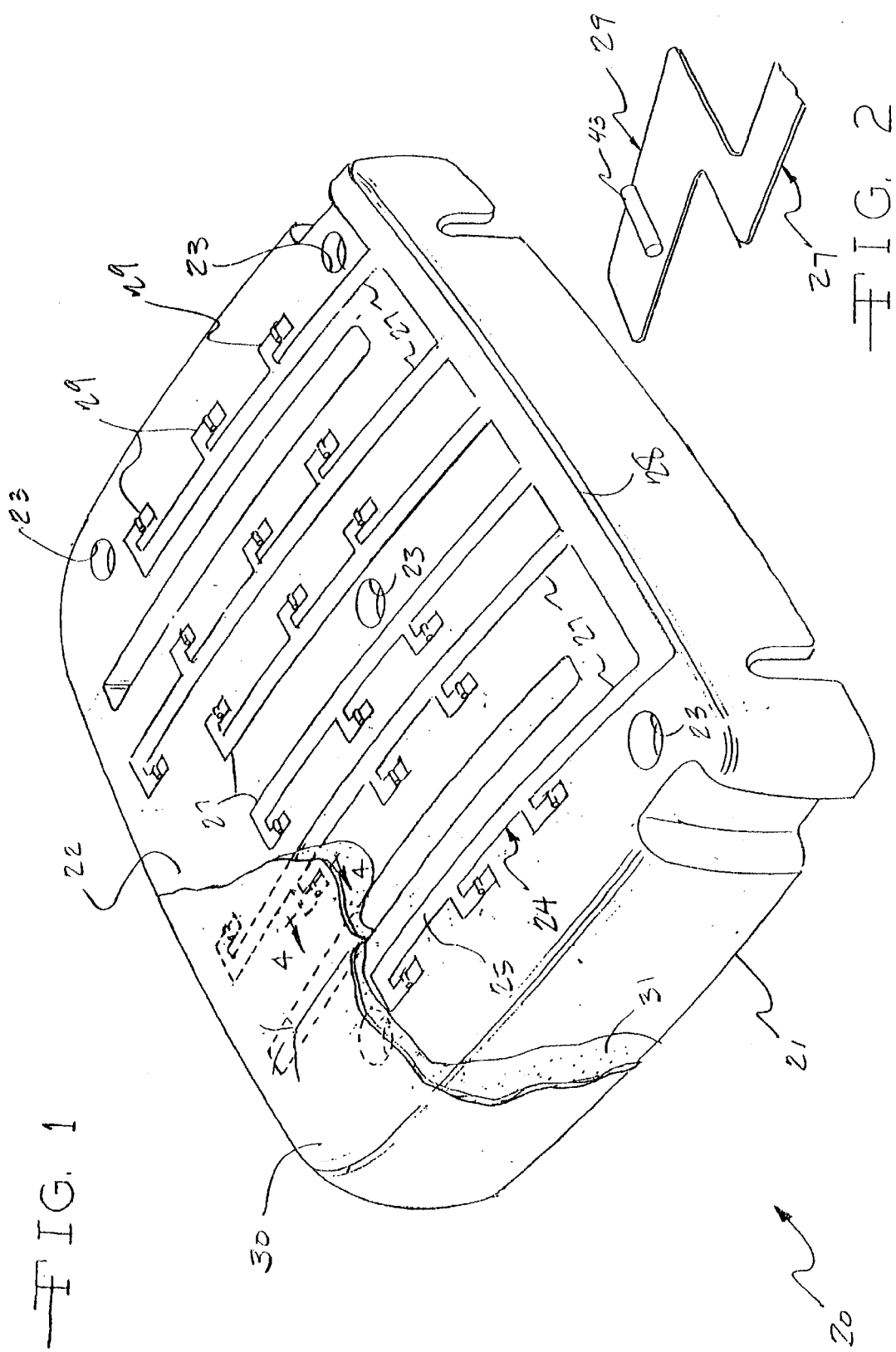

INSTALLATION DEVICE FOR INSTALLING A FLEXIBLE SENSOR ON A SEAT CUSHION

CROSS REFERENC TO RELATED APPLICATION

This claims the benefit of U.S. provisional patent application identified as Application No. 60/152,061, filed Sep. 2, 1999.

BACKGROUND OF THE INVENTION

This invention relates in general to a vehicular seat assembly having a flexible air bag suppression sensor apparatus. More specifically, this invention relates to an apparatus and a method of installing a flexible sensor apparatus to a seat cushion.

Vehicular air bags play an important role in restraining a seat occupant in vehicular crash situations. However, air bags designed for adequately restraining a large sized occupant may not provide optimal restraint protection for a smaller sized occupant or for a child occupying a child seat. In addition, the deployment of an air bag corresponding to an unoccupied seat represents an unnecessary repair expense.

Sensor apparatuses have been proposed for detecting whether or not a given seat is occupied. These types of sensor apparatuses act as on/off switches in controlling the deployment of a corresponding air bag. However, these types of sensor apparatuses simply address the need for preventing the deployment an air bag when the seat is unoccupied.

Other sensor apparatuses have been proposed to detect the placement of an occupant in a given seat for the purpose of suppressing the deployment of a corresponding air bag. Specifically, these types of sensor apparatuses detect whether or not the front and/or rear portions of a given seat are occupied. In situations in which only the front or only the rear portion of the seat is occupied, a sensor apparatus provides a signal for controlling the degree in which the air bag is to be suppressed during deployment. However, these sensor apparatuses do not provide a means for suppressing the air bag when both the front and rear portions of the seat are occupied.

Other sensor apparatuses have been proposed which determine the weight of an occupant based on detected variations in seat occupancy loading for providing a means of controlling the degree in which a respective air bag is to be suppressed during deployment. However, these types of sensor apparatuses require that a sensor apparatus be directly mounted to the structure of a given seat and that the sensor apparatus itself be structural. Consequently, these sensor apparatuses are relatively massive. Additionally, these sensor apparatuses are typically sensitive to physical and environmental changes that affect the repeatability of the performance of the sensor apparatus.

Other sensor apparatuses include a flexible sensor apparatus mounted to a seating face of a seat cushion. The flexible sensor apparatus includes at least one sensor track disposed in at least one track channel in the seating face. The flexible sensor apparatus is capable of detecting both the size of a passenger and the presence of an occupied child seat for the purpose of controlling the degree in which a corresponding air bag is to be suppressed during deployment. The flexible sensor apparatus offers improved reliability, as well as the advantages of being nonstructural and compact.

SUMMARY OF INVENTION

This invention also concerns an apparatus and method of installing a flexible sensor apparatus to the seat cushion. The apparatus and method provide an economical means to accurately and consistently mount a flexible sensor apparatus on a seat cushion.

In a preferred embodiment, an installation device for installing a flexible sensor apparatus on a seat cushion includes a frame. The frame slidably supports a mount. The frame supports an installation fixture. The installation fixture includes a saddle having locating recesses and ports extending from the recesses to a vacuum source. A vacuum from the vacuum source retains the flexible sensor apparatus in the locating recesses.

A preferred method according to this invention of installing a flexible sensor apparatus to a seat cushion includes the steps of: providing an installation device having an installation fixture and a lid opposing the installation fixture; locating the flexible sensor apparatus to the installation fixture; holding the flexible sensor apparatus to the installation fixture; aligning the seat cushion to the flexible sensor apparatus; mounting the seat cushion on the installation fixture; aligning the lid with the seat cushion; moving the lid and installation fixture relatively toward each other; and engaging the lid and the seat cushion.

Various other objects and advantages of this invention will become apparent to those skilled in the art from the following detailed description of the preferred embodiment, when read in light of the accompanying drawings.

BRIEF DESCRIPTION OF THE DRAWINGS

FIG. 1 is a perspective view of a vehicular seat cushion assembly including a flexible sensor apparatus attached to a seat cushion.

FIG. 2 is an enlarged perspective view of a portion of the flexible sensor apparatus shown in FIG. 1 removed from the seat cushion for clarity of illustration.

DETAILED DESCRIPTION OF THE PREFERRED EMBODIMENT

Figure 3:
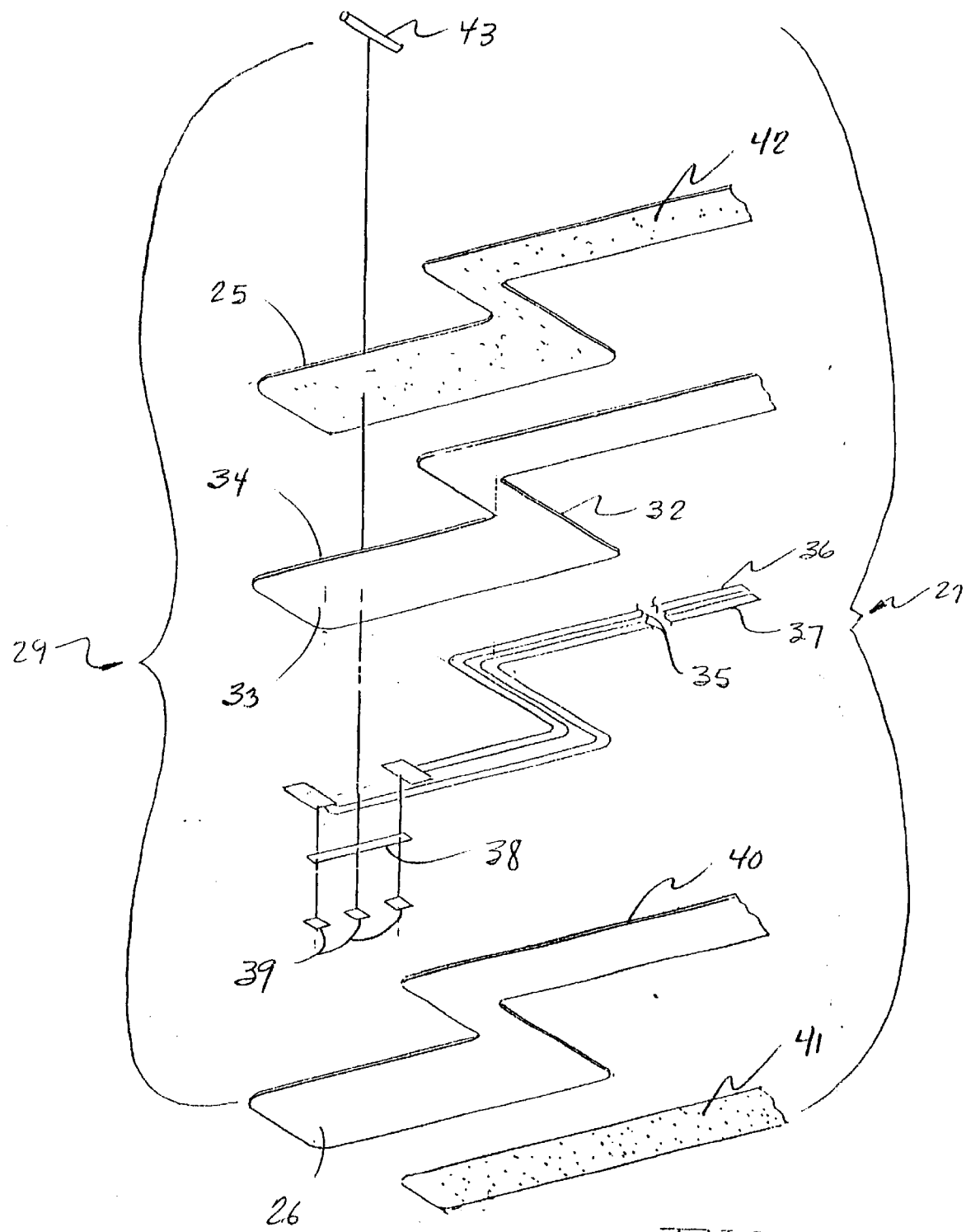
FIG. 3 is an exploded perspective view of the sensor branch shown in FIG. 2.

A first embodiment of a vehicular seat cushion assembly is shown generally at 20 in FIG. 1. The vehicular seat cushion assembly 20 comprises a seat cushion 21 having a seating face 22. The seat cushion 21 is shown as a seat bottom cushion, but may be a seat back cushion. The seating face 22 includes a plurality of locating apertures 23. Each locating aperture 23 is adapted for receiving a corresponding locating boss of an installation device (not illustrated in FIG. 1). One of the locating apertures 23 is adjacent to the center of the seating face 22, and one of the locating apertures 23 is adjacent to one of each of the corners of the seating face 22. It should be appreciated that the number and location of the locating apertures 23 may vary.

The vehicular seat cushion assembly 20 further comprises a flexible sensor apparatus indicated generally at 24. The flexible sensor apparatus 24 has a loading face 25 and a mounting face 26 (FIG. 3) opposite the loading face 25. The mounting face 26 contacts the seating face 22. The flexible sensor apparatus 24 acts as a signal generator for controlling the deployment of a passenger air bag (not shown).

The locating apertures 23 locate the seat cushion 21 to the installation device. The installation device is used in mounting the flexible sensor apparatus 24 to the seating face 22. The details of the installation device are described below.

The flexible sensor apparatus 24 includes a plurality of sensor tracks 27 extending from a lead track 28. Each sensor track 24 includes a plurality of sensor branches 29. The sensor branches 29 represent the actual sensing portion of the flexible sensor apparatus 24. The placement and the number of sensor branches 29 are empirically determined for a given vehicular seat cushion assembly.

A trim cover 30 is attached to the seating face 22 by a trim adhesive 31 applied to the underside of the trim cover 30, whereby the flexible sensor apparatus 24 is captured between the trim adhesive 31 and the seating face 22. Alternatively, the trim cover 30 may be attached to the seating face by any other suitable attachment means.

An enlarged view of one of the sensor branches 29 is shown in FIGS. 2 and 3. FIG. 3 is an exploded view of the sensor branch 29 shown in FIG. 2. Referring to FIG. 3, each sensor branch 29 includes a flexible ribbon 32 having a sensor face 33 and a tape face 34 opposite the sensor face 33. The flexible ribbon 32 consists of a well-known elastic-nonconductive material. Examples of such materials include various polymers such as polyamide, polycarbonide, or Mylar. The preferred thickness of the flexible ribbon 32 is about 0.5–1.5 millimeters.

A first conductor 35 is attached to the sensor face 33. The first conductor 35 consists of a well-known elastic-constant-resistance-conductive material. Preferably, the first conductor 35 is conductive ink applied in a liquid form that adheres to sensor face 33 when dry. The preferred thickness of the first conductor 35 is about 0.01–1.0 millimeters. The first conductor 35 includes a first leg 36 and a second leg 37. One end of each of the first leg 36 and second leg 37 is connected to an appropriate electrical device (not shown) such as a microprocessor.

Figure 4:
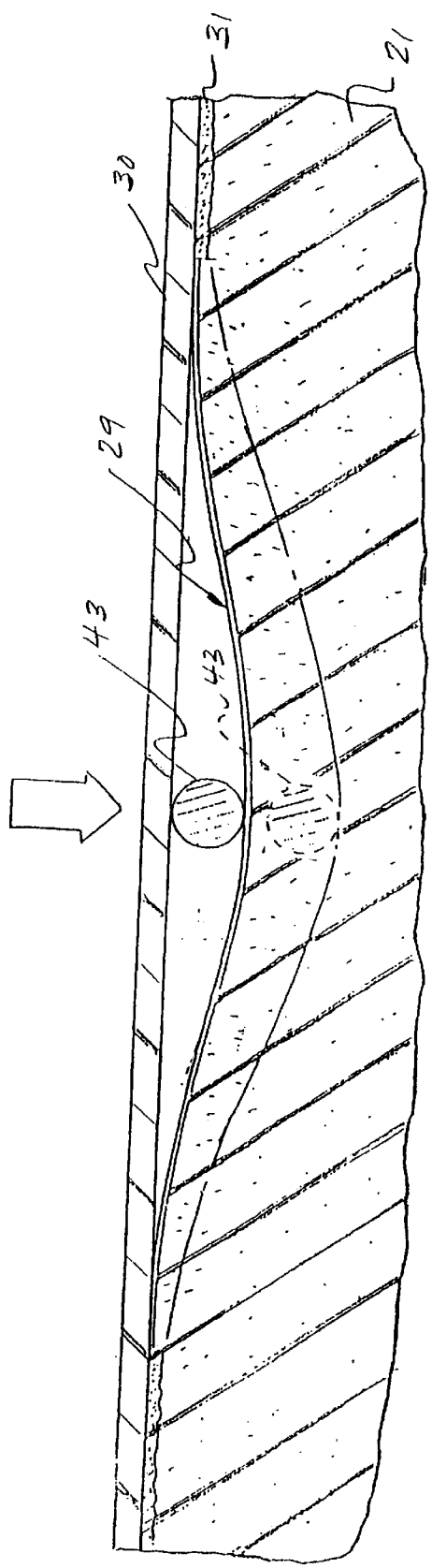
FIG. 4 is an enlarged sectional view taken along line 4—4 of FIG. 1.

A flexible sensor 38 is attached to the sensor face 33 and interconnects a terminating end of each of the first leg 36 and second leg 37. The flexible sensor 38 consists of a well-known elastic-variable-resistance-conductive material. Preferably, the flexible sensor 38 is conductive ink applied in a liquid form that adheres to sensor face 33 when dry. The selected ink may include graphite in combination with a binder. The preferred thickness of the flexible sensor 38 is about 0.1–1.0 millimeter. The shape of the flexible sensor 38 is shown to be straight but may be any designated pattern depending on a given application. The flexible sensor 38 generates a voltage signal that varies with the degree of bending exhibited by the flexible sensor 38. In other words, the resistance of the flexible sensor 38 varies as the flexible sensor 38 moves between an unloaded position and a maximum loaded position. FIG. 4 illustrates the unloaded position and maximum loaded position (shown in phantom) of a given sensor branch 29.

Figure 5:
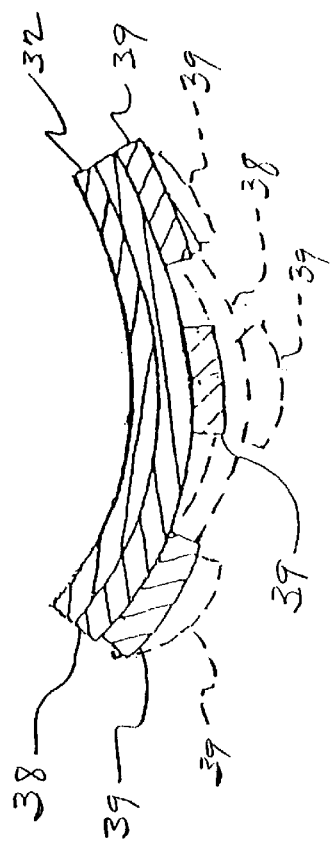
FIG. 5 is a greatly enlarged view of a portion of the sensor branch shown in FIG. 4 illustrating a flexible sensor.

FIG. 5 shows an enlarged portion of FIG. 4 illustrating the flexible sensor 38 in the unloaded position and maximum loaded position (shown in phantom). The flexible sensor 38 is shown slightly bent in the unloaded position. This bending is due to the trim cover 30 being tautly fastened to the seat cushion 21. For purposes of this description, the terms "unloaded" and "loaded" refer to seat occupancy loading conditions.

FIGS. 3 and 5 further show a second conductor 39 attached to the flexible sensor 38. The second conductor 39 is well-known elastic, constant-resistance-conductive material. Preferably, the second conductor 39 is silver formed in segments and is applied in a liquid form so as to bond to the flexible sensor 38 when dry. The second conductor 39 regulates the resistivity of the flexible sensor 38, thereby reducing the variance of the signal generated by the flexible sensor 38. The preferred thickness of the second conductor 39 is about 0.2–1.0 millimeter. The length, width and spacing of the segments of the second conductor 39 are empirically determined to ensure that the signal generated by the flexible sensor 38 is consistently repeatable between the unloaded and maximum loaded positions.

Referring to FIG. 3, a protective coating 40 is applied to sensor face 33 so as to cover the flexible sensor 38, the first conductor 35 and the second conductor 39. The protective coating 40 acts a moisture barrier and is of a well-known moisture-proof material. A ribbon adhesive 41 covers a predetermined portion of the protective coating 40. The ribbon adhesive 41 contacts the seating face 22, thereby adhering the flexible ribbon 32 to the seating face 22. As is further discussed below, prior to installing the flexible sensor apparatus 24 to the seat cushion 21, each sensor track 27 is provided with an adhesive backing strip (not shown) so as to cover the ribbon adhesive 41. Preferably, the backing strips are made of a low-tack paper. The backing strip protects the adhesive from becoming contaminated and provides for easier handling of the flexible sensor apparatus during the process of installation. Alternatively, the ribbon adhesive 41 may be replaced by any suitable means of attachment such as hook-and-loop fasteners, self-tapping fasteners, or the like. Additionally, the ribbon adhesive 41 may be directly applied to a predetermined portion of the seating face 22 rather than being directly applied to the protective coating 40.

A protective tape 42 is adhered to the tape face 34. The protective tape 42 protects the flexible ribbon 32 against puncturing or tearing and is of a well-known tear-resistant material.

A cylindrically shaped flexor 43 is adhered to the protective tape 42. Preferably, the length of the flexor 43 is substantially perpendicular to the length of the flexible sensor 38, and the approximate midpoint of the length of the flexor 43 is adjacent to the approximate midpoint of the length of the flexible sensor 38. The flexor 43 is of a well-known rigid material. The flexor 43 causes the flexible sensor 38 to bend when the seating face 22 is subject to seat occupancy loading in the vicinity of the flexor 43.

Figure 6:
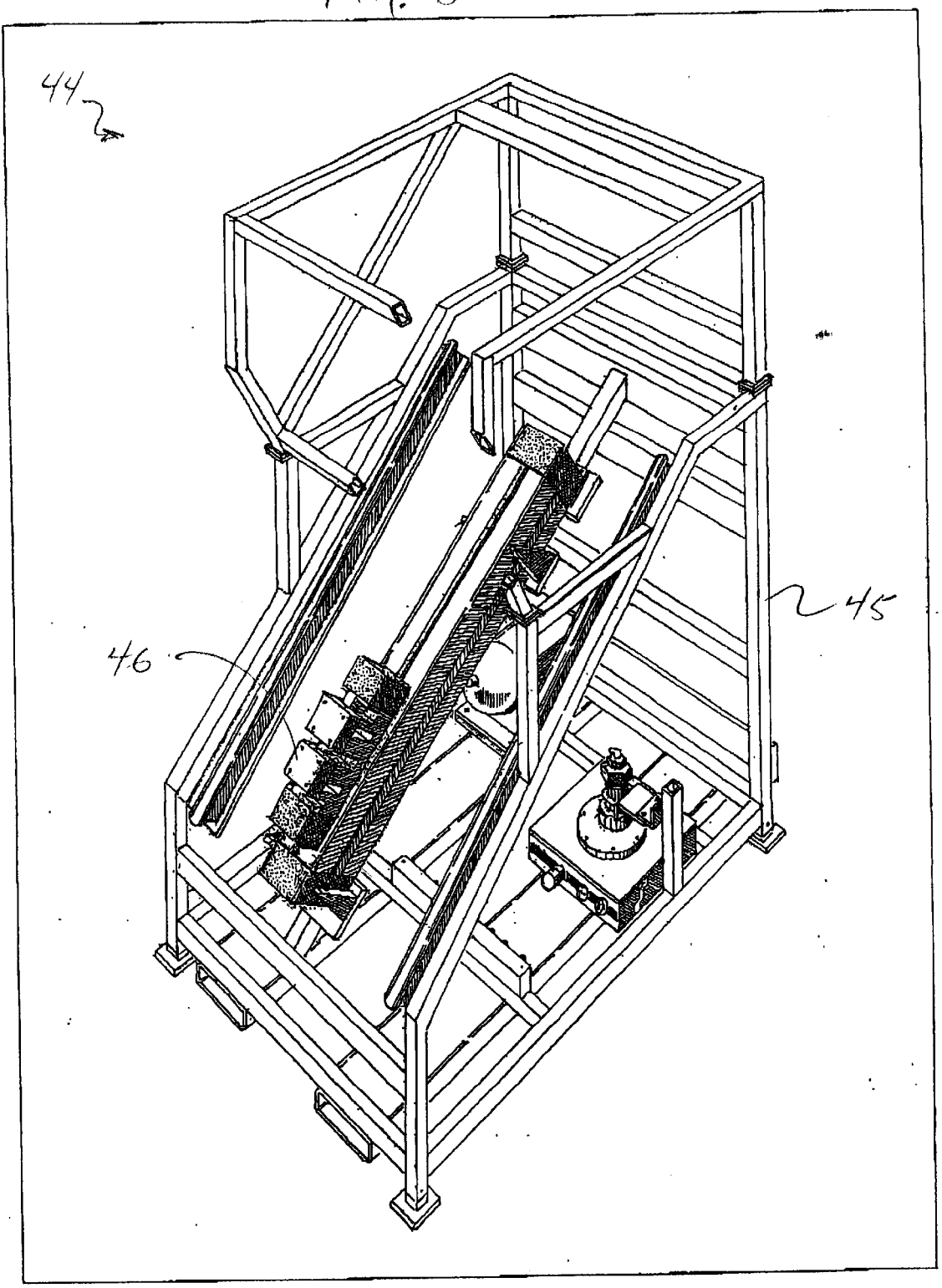
FIG. 6 is a perspective view of a support frame of the installation device according to this invention.

An installation device for installing the flexible sensor apparatus 24 is indicated generally at 44 in FIG. 6. The installation device 44 includes a support frame 45. A mount 46 is slidably supported by the frame 45 for movement between a first position and a second position. A drive means (not shown) is operatively connected to the mount 46 for moving the mount 46 between the first and second positions.

Figure 7:
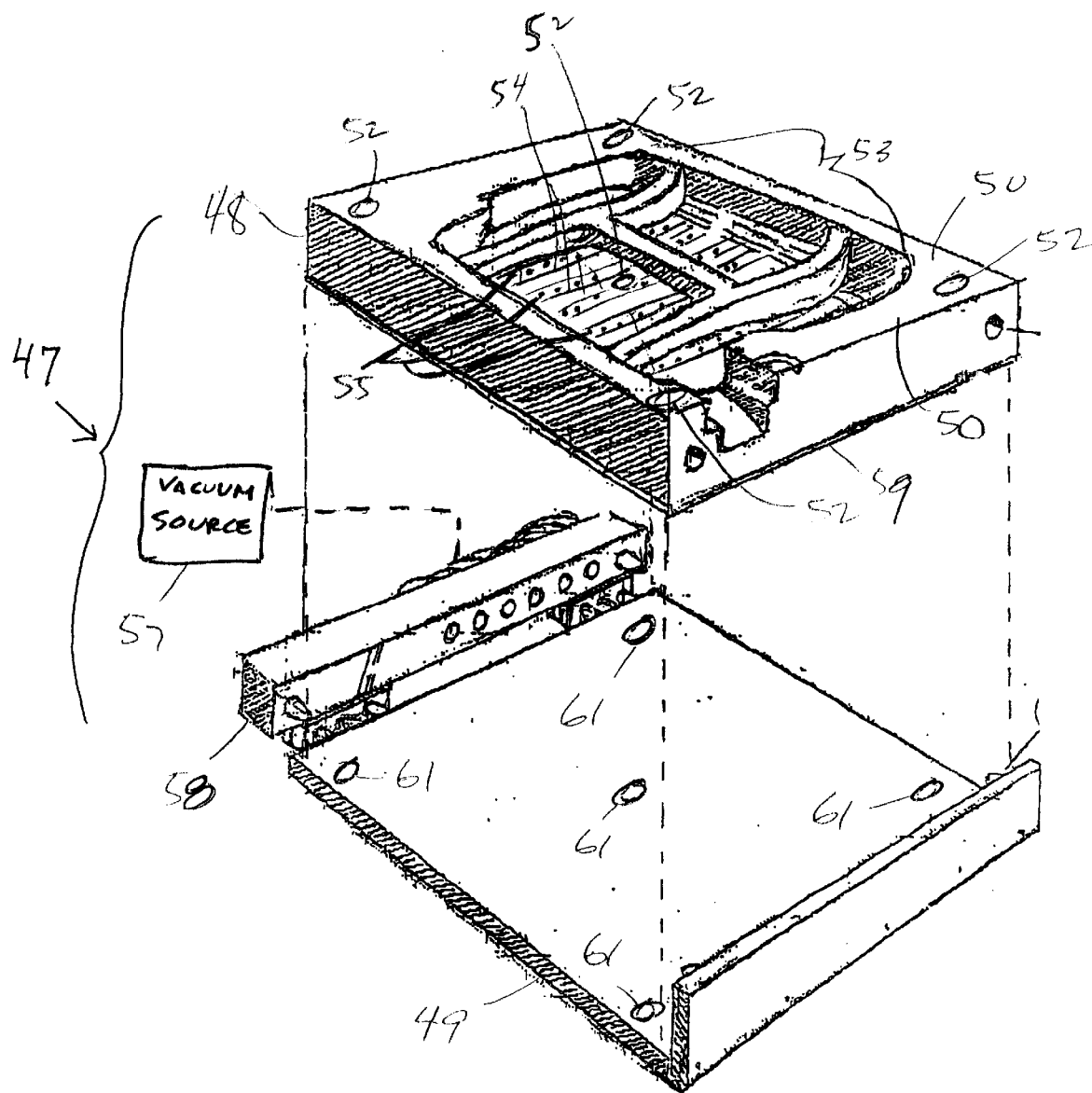
FIG. 7 is a partially exploded perspective view of an installation fixture for the installation device shown in FIG. 6.
Figure 8:
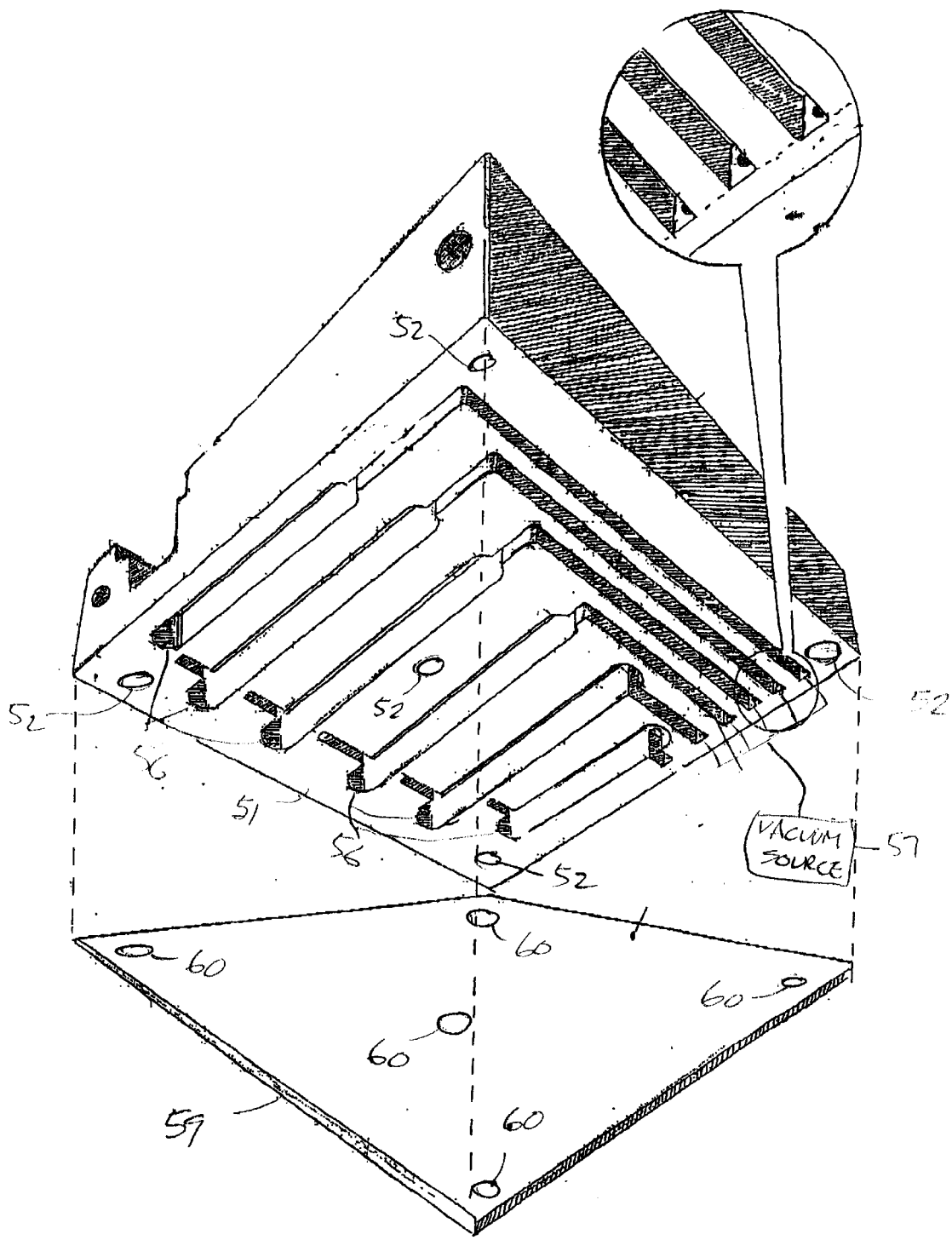
FIG. 8 is an exploded perspective view of a saddle portion of the installation fixture shown in FIG. 7.

The installation device 44 further includes an installation fixture indicated generally at 47 in FIG. 7. The installation fixture 47 includes a saddle 48 attached to a platform 49. The saddle 48 includes a first face 50, shown in FIG. 7, and a second face 51, shown in FIG. 8. Locating bores 52 extend between the first and second faces 50, 51. The locating bores 52 assist in locating the seat cushion 21 to the saddle 48 as described below in detail. The first face 50 includes a seating portion 53 that is shaped complementary to the contour of the seating face 22. Preferably, locating recesses 54 are formed in the seating portion 53. As described below in detail, each locating recess 54 is shaped complementary to the shape of an associated one of the sensor tracks 27 and has a depth approximately equal to the thickness of the flexible sensor apparatus 24. The locating recesses 54 are used to locate the sensor tracks 27 on the saddle 48. Preferably, the bases of the locating recesses 54 are coated with a color pigmented epoxy, a paint or the like, different in color than the remaining portion of the seating portion 53. This color contrast further assists in locating the sensor tracks 27 on the saddle 48. In addition, slots (not shown) are preferably formed in the seating portion 53 for receiving the flexors 43. Ports 55 extend from each base of the locating recesses 54 and are connected in fluid communication with an associated channel 56 (shown in FIG. 8).

The channels 56 are connected in fluid communication with a vacuum source 57 via a manifold 58 that is connected to the saddle 48 and the platform 49. A cover 59 covers the second face 51 for the purpose of sealably enclosing the channels 56. Locating bores 60 and 61, which align with the locating bores 52, are formed through the cover 59 and the platform 49, respectively.

The vacuum source 47 is operably connected to a switch pedal (not shown). The switch pedal preferably has multiple switch positions. Each switch position draws a vacuum through a selected channel 56 and the associated ports 55.

The installation device 44 further includes a lid (not shown) that is movably supported by the frame 45 for movement between a released position and an applied position. The lid is operably connected to a pneumatic or hydraulic cylinder or the like (not shown). The lid is located on the frame 45 so as to oppose the first face 50 of the saddle 48 when the saddle 48 is in the second position. When moving from the released position to the applied position, the lid advances toward the saddle 48. In the released position, when the seat cushion is mounted on the saddle 48 and the saddle 48 is in the second position, the lid has retreated a sufficient distance from the saddle 48 to clear the seat cushion 21.

The installation device 44 also includes locating bosses (not shown), aligned with the corresponding locating bores 52, 60 and 61, supported by the frame 45 for movement between a retracted position and an extended position. The movement of the locating bosses is driven by a pneumatic or hydraulic cylinder or the like (not shown). In the extended position, the locating bosses extend through the saddle 48 so that the locating apertures 23 may be placed about the associated locating bosses. In the retracted position, the locating bosses retract within the saddle 48 to allow the seat cushion 21 to be easily removed from the saddle 48.

In operation, the installation fixture 47 and the lid are first placed in the first position and the released position, respectively. The flexors 43 and the sensor tracks 27 are then disposed in the associated slots and locating recesses 54 in a selected order. Having placed a selected flexor 43 and the associated sensor track 27 in the associated slot and locating recess 54, respectively, the vacuum source 57 is energized and the switch pedal is selectively positioned to apply a vacuum to the associated sensor track 27. This process is repeated until each sensor track 27 is properly positioned and held to the saddle 48. It should be understood that a vacuum may be applied to a selected channel 56 prior to locating the associated sensor track 27 and flexor 43 to the selected channel 56. With the vacuum holding the sensor tracks 27 in place, the backing strips are then removed. The locating bosses are then moved from the retracted position to the extended position. The locating apertures 23 are then placed about the locating bosses with the cushion face 22 opposing the first face 50. The installation fixture 47 is then moved to the second position. In turn, the lid is moved toward the applied position. As the lid advances toward the installation fixture 47, the lid engages the locating bosses. As the lid further advances, the lid forces the locating bosses to move toward the retracted position. Continued advancement by the lid then causes the seat cushion 21 to compress. As the seat cushion 21 is compressed, the seating face 22 engages the adhesive 41. The lid reaches the applied position when the lid is a specified distance from the installation fixture 47. When the lid reaches the applied position, the vacuum source 47 is de-energized. The lid is then held in the applied position for a specified time interval. After the specified dwell period, the lid is moved to the released position. The installation fixture 47 is then moved to the first position and the seat cushion assembly 20 is removed.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An installation device for installing a flexible sensor apparatus on a seating surface of a seat cushion comprising:
   a frame;
   a mount slidably supported by the frame; and
   an installation fixture supported by the frame, the installation fixture including a saddle including a first face having a seating portion recess formed therein generally conforming to the shape of the seating surface of the seat cushion, the first face further having at least one locating recess formed in the seating portion recess, the locating recess generally conforming to the shape of a portion of the flexible sensor apparatus, the saddle further having ports extending from the locating recess to a vacuum source, wherein a vacuum from the vacuum source retains the flexible sensor apparatus in the locating recess.

2. The installation device specified in claim 1 wherein the saddle of the installation fixtures includes a seating portion in which the locating recess are formed.

3. The installation device specified in claim 1 wherein a base of the locating recess is coated with a material having a color different than the color of the base of the seating portion recess.

4. The installation device specified in claim 1 wherein the saddle includes a first face and a second face, and wherein the locating recess are formed in the first face.

5. The installation device specified in claim 4 wherein channels are formed in the second face, and wherein the ports extend from the locating recess to the channels.

6. The installation device specified in claim 5 including a cover mounted on the second face that sealably encloses the channels.

7. The installation device specified in claim 1 including a platform that receives the saddle.

8. The installation device specified in claim 1 including a manifold connected between the vacuum source and the saddle.

9. An installation fixture for receiving a flexible sensor apparatus comprising:
- a saddle having a first face and a second face;
- a seating portion recess formed in the first face generally conforming to the shape of the seating surface of the seat cushion;
- at least one locating recess formed in the seating portion recess generally conforming to the shape of a portion of the flexible sensor apparatus;
- a channel formed in the second face;
- a port extending from the locating recess to the channel; and
- a vacuum source connected to the saddle and in fluid communication with the channel so that a vacuum applied to the channel retains a flexible sensor apparatus in the locating recess.

10. The installation fixture specified in claim 9 including a cover attached to the second face of the saddle to sealably enclose the channel.

11. The installation fixture specified in claim 9 wherein a base of the locating recess is coated with a material having a color different than the color of the base of the seating portion recess.

12. The installation fixture specified in claim 9 including a manifold connected between the vacuum source and the saddle.

13. The installation device specified in claim 1, wherein the locating recess has a depth generally corresponding to the height of the flexible sensor apparatus.

14. The installation fixture specified in claim 9, wherein the locating recess has a depth generally corresponding to the height of the flexible sensor apparatus.

* * * * *